May 17, 1927.
A. V. SULLIVAN
COMBINATION PEACH PITTER
Filed Aug. 5, 1926
1,629,131
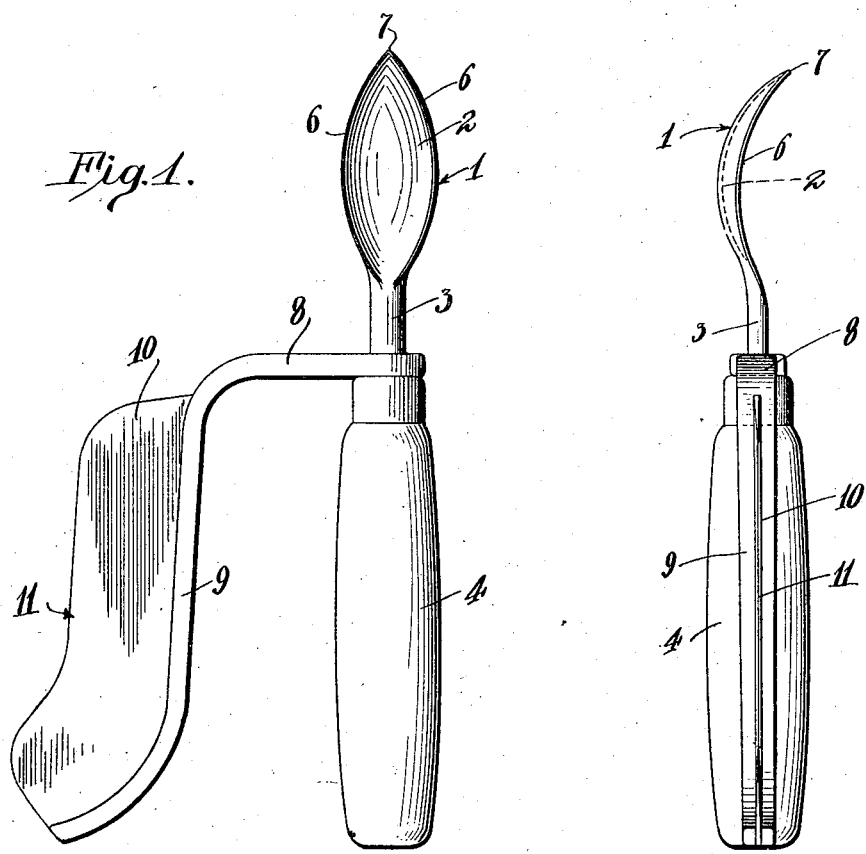
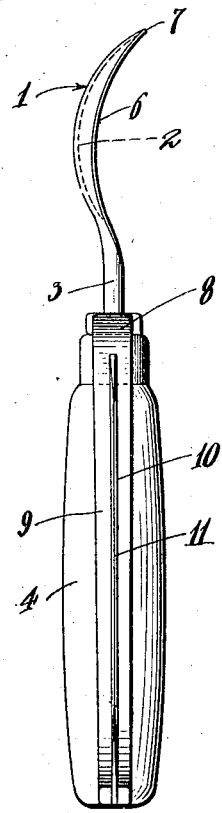
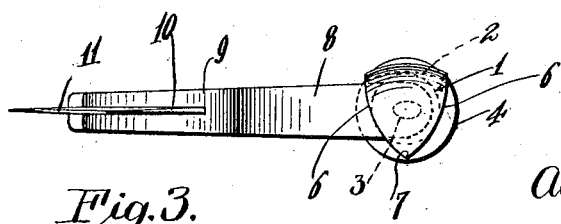
Fig.1.
Fig.2.
Fig.3.
Inventor
Albert V. Sullivan
By Lyon & Lyon
Attorneys Patented May 17, 1927.

1,629,131

UNITED STATES PATENT OFFICE.

ALBERT V. SULLIVAN, OF ALAMEDA, CALIFORNIA, ASSIGNOR TO CALIFORNIA PACKING CORPORATION, OF SAN FRANCISCO, CALIFORNIA, A CORPORATION OF CALIFORNIA.

COMBINATION PEACH PITTER.

Application filed August 5, 1926. Serial No. 127,212.

This invention relates to a combination peach pitter and is more particularly related to a combination cutting knife and pitting spoon for the halving and pitting of clingstone peaches and like fruit.

In the preparation of peaches for canning or drying, the peach halved and pitted and the removal of the pit of a clingstone peach is a somewhat difficult task. Many have sought to provide means whereby this halving and pitting operation could be performed economically by machinery in an automatic or semi-automatic manner. To date none of these machines or means have, because of economic reasons and condition of the product, replaced or displaced the manual halving and pitting of the fruit, using a cutting knife and a pitting spoon.

It has heretofore been the practice in pitting fruit, particularly pitting clingstone peaches, for the operator to first halve the fruit and then in a separate operation or another operator to remove the pit from the halved fruit, employing a pitting spoon having a curved bowl. In some instances, the pit has been removed before the fruit is halved. However, where the fruit is prepared for the purpose of canning, it has been found that it is advisable to first halve the peach in order to provide an exit for the pit after the same has been cut from the flesh. During the process of halving and pitting the fruit, it has heretofore been the practice to employ a cutting knife and a separate pitting spoon so that the operator either had to lay the cutting knife down and pick up a pitting spoon, resulting in a loss of time or employing a series of operations. The operator then had to lay down the halved fruit, after cutting the same, and a second operator picked up the fruit and removed the pit with a pitting spoon, likewise resulting in loss of time. In accordance with this invention, one operator is enabled to halve and pit the fruit without laying down either the halving and pitting tool or the fruit, resulting in a great saving of time.

I have discovered that where a combination spoon is constructed so that the blade of the knife lies substantially in the plane of the bowl of the pitting spoon, that the operator may in one cycle of operation halve the fruit so that the cleavage formed in the flesh of the fruit will be so presented to the pitting spoon which is secured to the cutting knife that the pitting spoon will pass directly into the cleavage of the fruit with a slight turn of the wrist, in order to insert the same into the bud end of the fruit so that the pit may be severed from the flesh.

An object of this invention is therefore to provide a combination peach pitter having a spoon provided with a shank and to which shank a halving blade is secured in such a manner that its cutting edge lies substantially in the plane of the bowl of the spoon so that when the fruit is severed by means of a halving blade, the bowl will be presented in the plane of the cleavage formed through the fruit so that the same will simply pass into the cleavage without necessitating relative rotation of the fruit and the spoon.

Another object of this invention is to provide a combination peach pitter having a spoon secured to a shank and a blade secured to the shank in such a manner that the cutting edge of the blade lies substantially in the plane of the bowl of the spoon and extends longitudinally downward along the said shank.

Another object of this invention is to provide a combination peach pitter having a spoon and a knife, the cutting edge of which knife lies in the plane of the bowl of the spoon, and which knife is secured to the shank of the spoon by means of a rim which protects the knife from the hand of the operator.

Other objects and advantages of this invention will be apparent from the following detailed description of a preferred embodiment thereof as illustrated in the accompanying drawings, in which drawings:

Figure 1 is a side elevation of the combination peach pitter embodying this invention.

Figure 2 is an edge elevation looking from left to right in Figure 1.

Figure 3 is a top plan view thereof.

In the preferred embodiment of this invention, illustrated in the accompanying drawings, 1 comprises a spoon having a curved bowl 2 secured to or formed integral with a shank 3. A handle 4 is provided for the shank 3.

The spoon 1 may be of any desired or preferred construction as is well understood in the art and is preferably curved to approximate the curvature of the pitted fruit and is provided at its opposite sides with cutting edges 6 which terminate in a point 7.

Secured to the shank 3, preferably at a point near the bowl 2 and above the handle 4, is a rim 8 which extends upwardly from the shank 3 and is then extended downwardly for a portion of its length to provide a back 9 for the blade 10. The rim 8 is at its lower end curved outwardly from the handle 4 so as to provide a curved edge to prevent the operator's hand from contacting the sharp cutting edge 11 of the blade 10.

The cutting edge 11 lies substantially in the plane of the face of the bowl 2 so that as the cut or cleavage is formed in the fruit, the bowl 2 will be in position in the plane of such cleavage so that on continued rotation thereof, the same will be in position to pass in the bud end of the fruit as in the case of clingstone peaches.

The operator grips the combination peach pitter in his right hand and the peach in his left hand so that the seam of the peach lies in the plane of the cutting edge 11 of the blade 10. The peach and the blade are then rotated until a complete cut is formed around the seam of the peach and so that the bud end of the peach terminates substantially at the point 7 of the bowl 2. The bowl 2 is then thrust into the peach and in the line of cleavage and rotated to cut the flesh of the fruit around the pit.

It will therefore be obvious that the halving and pitting operations of the fruit is accomplished by rotation or movement of the fruit and the combination pitting member in one plane without necessitating the putting down of the fruit or tool and that during the relative rotation of the fruit and the tool that the whole tool will be presented into the line of cleavage or cut formed in the flesh of the fruit so that the same may be thrust down and operated to sever the pit from the flesh thereof.

Having fully described a preferred embodiment of my invention, it is to be understood that I do not wish to be limited to the exact details herein set forth which may obviously be varied without departing from the spirit of my invention as set forth in the appended claims.

I claim:

1. In a peach pitter, the combination of a spoon having a shank and halving blade secured to the said shank and having its cutting edge lying substantially in the plane of the spoon.

2. In a peach pitter, the combination of a spoon having a curved bowl, a shank, a halving blade secured to the said shank at a point near the said bowl and extending longitudinally downward along the said shank and having a cutting edge lying substantially in the plane of the said bowl.

3. In a peach pitter, the combination of a spoon having a curved bowl, a shank, a rim secured to the said shank and extending outwardly and downwardly therefrom, a halving blade secured to the said rim and having a cutting edge lying substantially in the plane of the said bowl.

Signed at San Francisco, Cal., this 27th day of July, 1926.

ALBERT V. SULLIVAN.